(12) United States Patent
Taylor

(10) Patent No.: US 6,234,055 B1
(45) Date of Patent: *May 22, 2001

(54) TIRE CUTTING APPARATUS AND METHOD

(76) Inventor: Byron Taylor, 19581 Millwood Dr., Woodlake, CA (US) 93286

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,041

(22) Filed: Feb. 22, 1999

(51) Int. Cl.[7] .............................. B23D 19/04; B26D 7/06; B26D 1/24
(52) U.S. Cl. .................................. 83/423; 83/502; 83/495
(58) Field of Search ...................... 82/86, 49, 54; 83/951, 423, 495, 502, 503, 508.2, 506

(56) References Cited

U.S. PATENT DOCUMENTS

| | | | |
|---|---|---|---|
| 39,294 | * 7/1863 | Leland | ................................ 83/495 |
| 1,895,852 | * 1/1933 | Johnstone | .............................. 83/506 |
| 2,318,904 | 5/1943 | Thompson . | |
| 2,698,037 | 12/1954 | Shaw . | |
| 3,460,419 | 8/1969 | Branick . | |
| 3,701,296 | 10/1972 | Snow . | |
| 3,830,120 | 8/1974 | Peterson . | |
| 3,931,935 | 1/1976 | Holman . | |
| 4,012,973 | * 3/1977 | Tupper | ................................... 82/86 |
| 4,069,729 | 1/1978 | Kuts . | |
| 4,072,072 | 2/1978 | Harb . | |
| 4,134,316 | 1/1979 | Bullinger . | |
| 4,238,980 | 12/1980 | Frame . | |
| 4,422,581 | 12/1983 | Chryst . | |
| 4,450,738 | 5/1984 | Tupper et al. . | |
| 4,976,178 | 12/1990 | Barclay . | |
| 5,054,351 | * 10/1991 | Jolliffe et al. | ......................... 83/430 |
| 5,199,337 | 4/1993 | Parker . | |
| 5,235,888 | 8/1993 | Dom . | |
| 5,285,707 | 2/1994 | Lodovico et al. . | |
| 5,534,208 | 7/1996 | Barr et al. . | |
| 5,590,838 | 1/1997 | Brewer . | |
| 5,601,004 | * 2/1997 | Queen | ................................... 83/951 |

\* cited by examiner

Primary Examiner—S. Thomas Hughes
Assistant Examiner—Marc Jimenez
(74) Attorney, Agent, or Firm—Bennet K. Langlotz, P.C.; Bennet K. Langlotz

(57) ABSTRACT

A tire cutter apparatus including a rotatable anvil wheel assembly and a cutter wheel assembly connected to a frame. The anvil wheel assembly has an anvil wheel with a smooth circumferential anvil surface. The cutter wheel assembly includes a cutter wheel having a peripheral edge. The cutter wheel assembly and the anvil wheel assembly are movable between a closed position in which the cutter wheel edge is adjacent the anvil surface to define a cutting site, and an open position in which the cutter wheel edge and the anvil surface are spaced apart. A gripping wheel having an articulated peripheral edge is connected to the cutter wheel assembly and/or to the anvil wheel assembly, so that the gripping wheel engages a portion of a tire to move the tire through the cutting site. The apparatus may be a compression cutter defining a nip, and multiple overlapping gripping wheels may be driven to drive the tire through the cutter.

19 Claims, 3 Drawing Sheets

TIRE CUTTING APPARATUS AND METHOD

FIELD OF THE INVENTION

This invention relates to apparatus and methods for cutting up vehicle tires to facilitate disposal.

BACKGROUND AND SUMMARY OF THE INVENTION

Disposal of worn vehicle tires is a problem of particular concern. Due to their shape, intact tires tend to collect standing water, creating a breeding ground for unwanted insects. Also, when buried in a landfill, intact tires tend to trap gas bubbles, which makes them buoyantly rise within a landfill, creating problems. These concerns are well known, and have been addressed by cutting tires into pieces that do not readily trap water or air. Many landfill facilities either refuse to accept whole tires, or charge several times more per pound to receive whole tires than cut tires.

Existing tire cutters use several approaches. Tire shredders operate to chop tires into a multitude of small pieces, but at significant operating cost. Shredders require an inordinate amount of energy, as tires are inherently tough, particularly due to the very strong steel or synthetic reinforcing fibers used, as well as the thick wire or cable used to reinforce the tire bead. These materials cause substantial wear on the rotary shear blades used. Such shredders are very large and expensive, making them impractical for widespread use. Accordingly, there are significant shipping costs to transfer tires to the nearest shredder facility, because they are generally few and far between.

Other tire cutters partially cut tires into segments that are more tolerably disposed of. These may be radial cuts, a circumferential "bagel" cut about the midline of the tread, or circumferential sidewall cuts that remove the sidewalls from the tread band.

Heavy shears have been used, but are too large and expensive for small scale operations, and are subject to significant wear making it difficult to hold necessary sharpness and tolerances, especially due to the difficulty of cutting bead wires. Sidewall cuts have been performed with knife blade cutters, but this is believed to be unsuitable for all but the lightest passenger car tires. Other cutters employ rapidly rotating saw-type blades that dull readily, or use rotary cutters that operate by shearing tire materials, with the attendant wear and tolerance difficulties.

The embodiment disclosed herein overcomes these disadvantages by providing a tire cutter apparatus including a rotatable anvil wheel assembly and a cutter wheel assembly connected to a frame. The anvil wheel assembly has an anvil wheel with a smooth circumferential anvil surface. The cutter wheel assembly includes a cutter wheel having a peripheral edge. The cutter wheel assembly and the anvil wheel assembly are movable between a closed position in which the cutter wheel edge is adjacent the anvil surface to define a cutting site, and an open position in which the cutter wheel edge and the anvil surface are spaced apart. A gripping wheel having an articulated peripheral edge is connected to the cutter wheel assembly and/or to the anvil wheel assembly, so that the gripping wheel engages a portion of a tire to move the tire through the cutting site. The apparatus may be a compression cutter defining a nip, and multiple overlapping gripping wheels may be driven to drive the tire through the cutter.

DETAILED DESCRIPTION OF A PREFERRED EMBODIMENT

Figure 1:
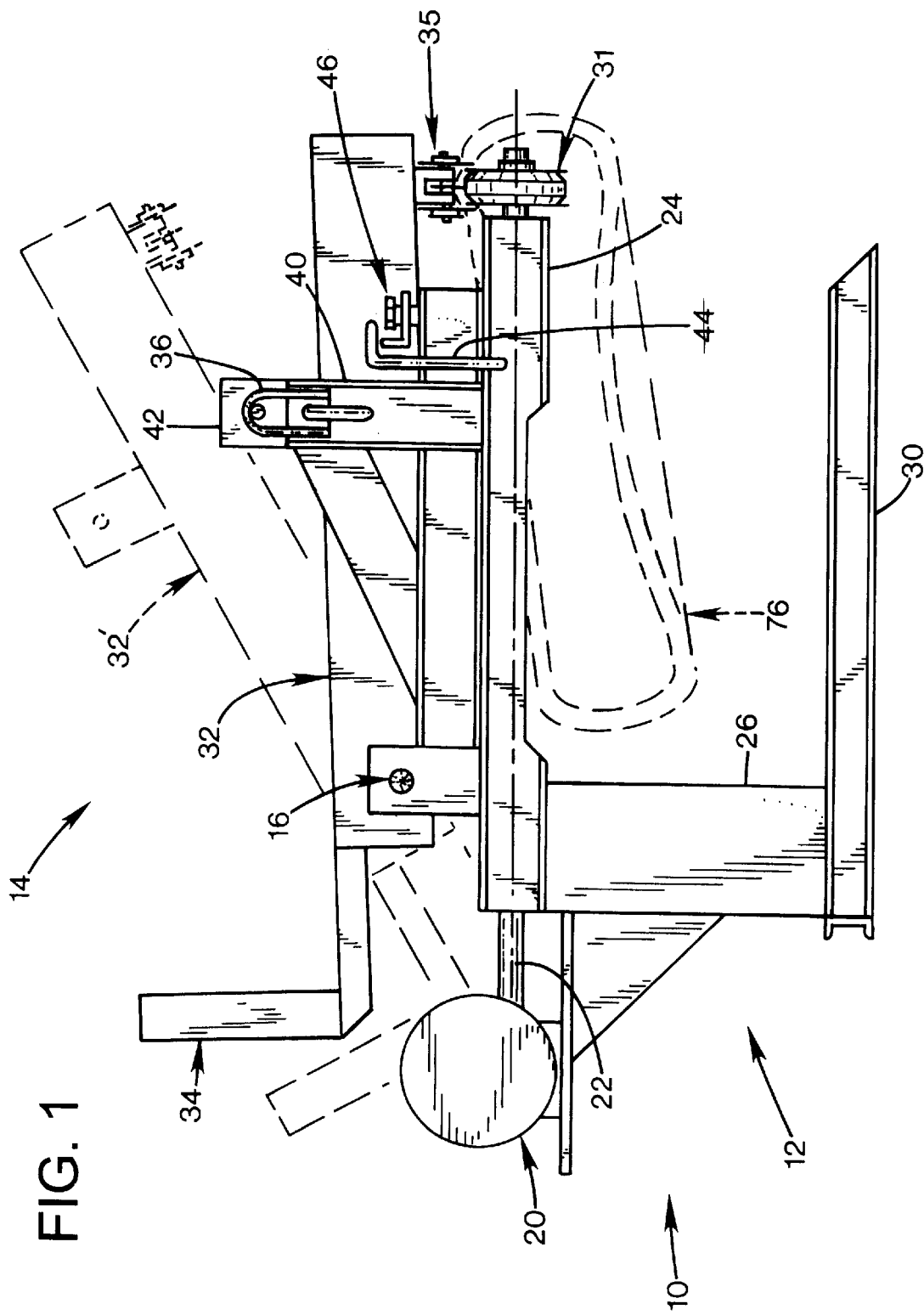
FIG. 1 is a side view of a tire cutter apparatus according to a preferred embodiment of the invention.
Figure 2:
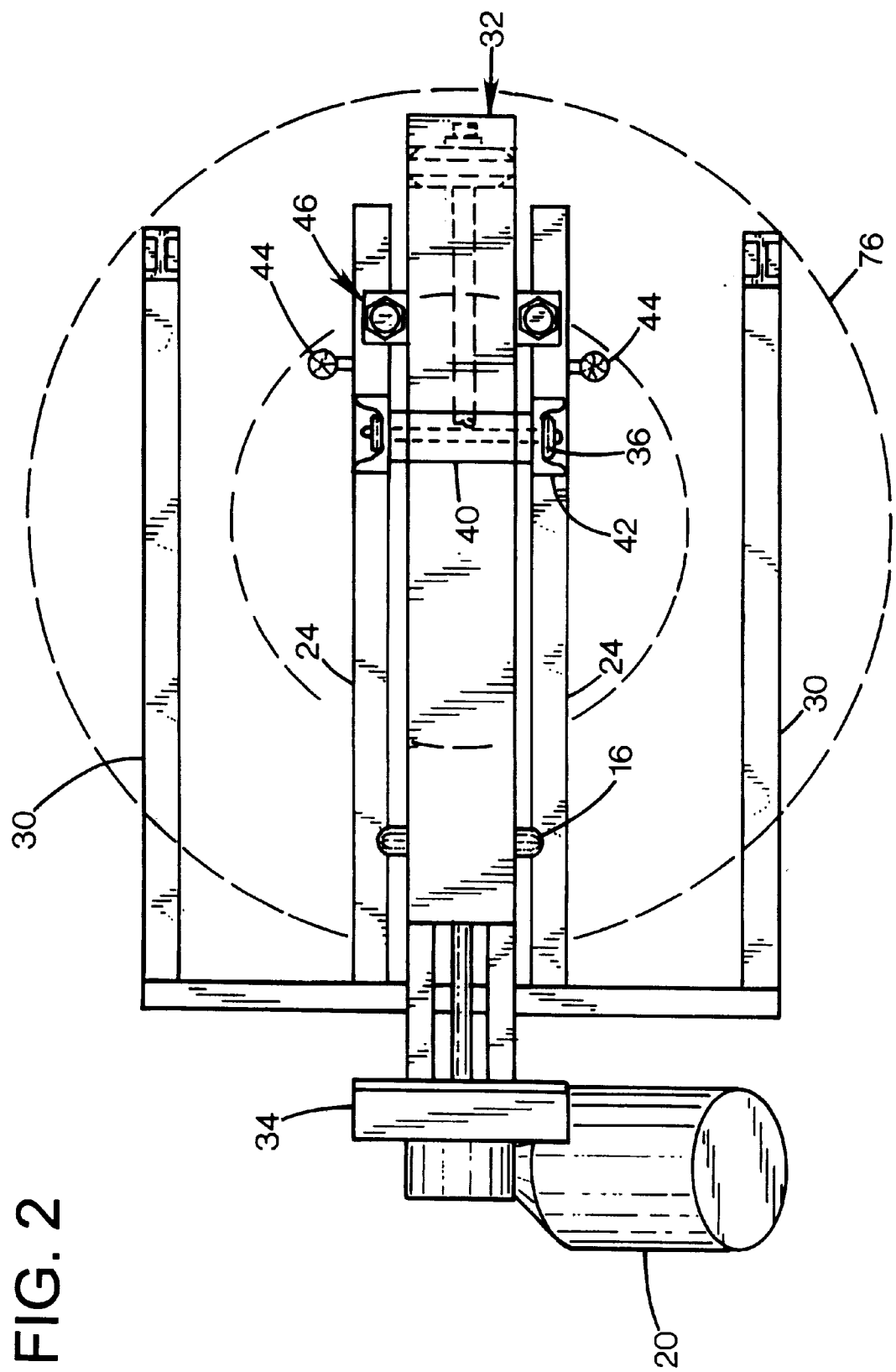
FIG. 2 is a top view of the apparatus of FIG. 1.

FIGS. 1 and 2 show a tire cutting apparatus 10 having a base portion 12 and a movable cutter arm assembly 14 pivotally mounted to the base at a pivot bearing 16. The base includes an electric drive motor 20 engaged via a speed reducer to a horizontal drive shaft 22 that extends laterally between a pair of horizontal anvil support arms 24. A vertical base member 26 supports the arms 24, and is supported by a pair of horizontal base members 30 extending beneath the arms 24. An anvil wheel assembly 31 is mounted to the free end of the shaft 22, just beyond the free end of the arms 24. The details of the anvil wheel assembly will be discussed below in conjunction with FIGS. 3a and 3b.

The cutter arm assembly 14 includes a cutter arm 32 that extends above the anvil support arms 24 from the pivot bearing, and extends in the opposite direction to support a counterweight 34. The free end of the cutter arm supports a cutter assembly 35 to be discussed in detail below. The arm pivots between a closed position shown and an open position shown in dotted lines and indicated by arm 32'. To secure the arm to the closed position, and to resist substantial forces that would otherwise work to open the arm during cutting operations, an over-center hold-down latch 36 is mounted to each of two hold-down columns 42 upstanding from intermediate positions on each of the anvil support arms 24. The hold-down columns extend upward beyond the upper surface of the cutter arm 32, to which is mounted a pin support element 40. The pin support element includes a pair of opposed laterally-extending pins that are engaged by the hold-down device as shown.

The anvil support arm 24 includes a pair of vertical guide pins 44, each attached to a lateral surface of a respective support arm 24 at a position between the hold-down column 40 and the free end, near the hold-down. Each pin 44 extends from a lower end just above the level of the drive shaft axis, to an upper end well above the cutter assembly. The position of the guide pins may be adjusted along the length of the anvil support arm to accommodate different size tires. A closure adjustment screw 46 is provided on the cutter arm to establish the position of the arm in the closed position, providing a solid stop that ensures that the cutter assembly 35 and anvil assembly 31 are positioned properly relative to each other during cutting operations. In alternative embodiments, the adjustment screw may be mounted on the anvil arm.

Figure 3B:
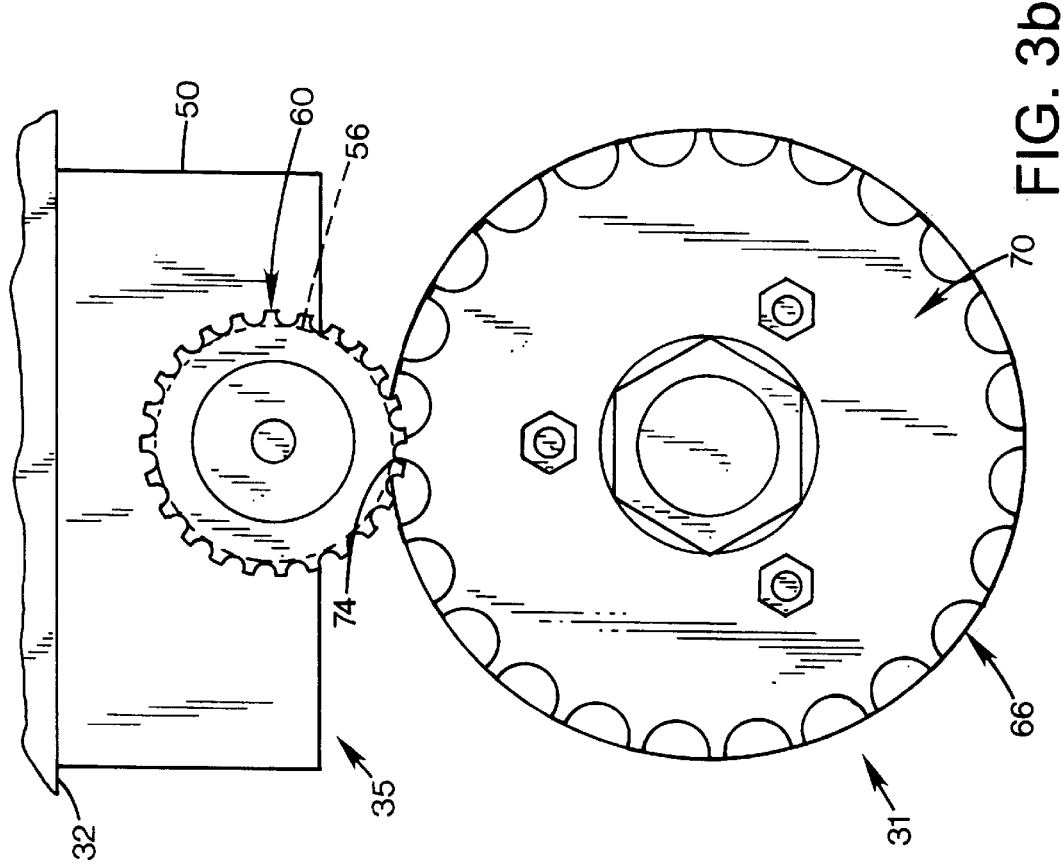
FIG. 3b is an end view of the apparatus of FIG. 1.
Figure 3A:
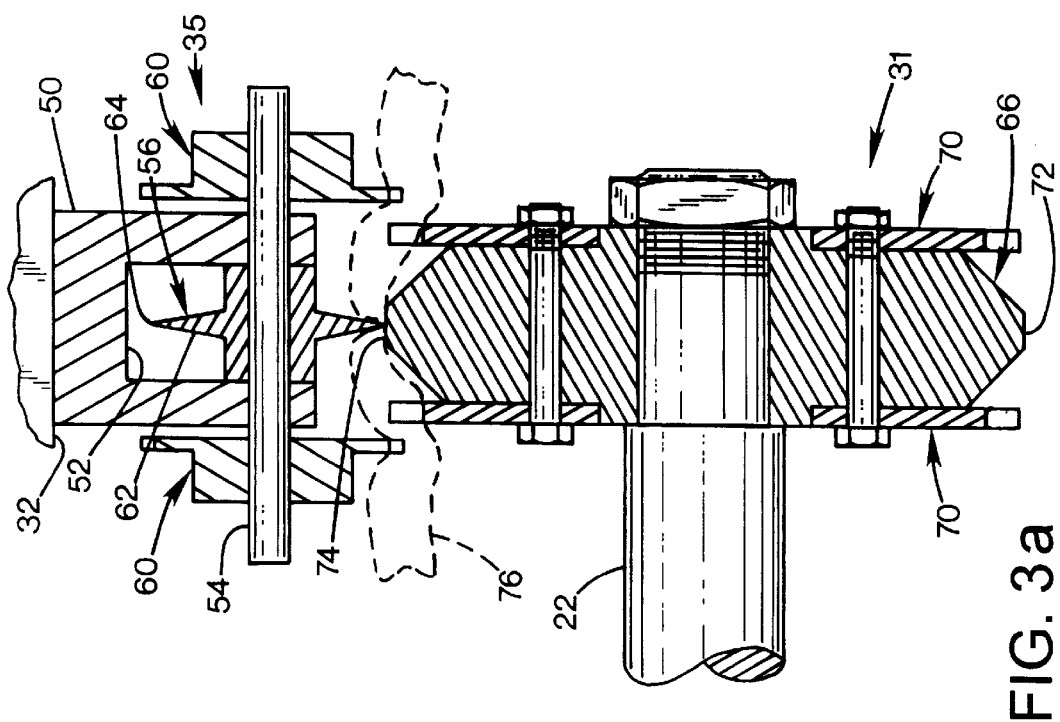
FIG. 3a is a sectional side view of the apparatus of FIG. 1.

FIGS. 3a and 3b show the cutter assembly 35 and anvil assembly 31 in greater detail. The cutter assembly 35 includes a channel block 50 mounted to the cutter arm 32 and defining a channel 52 open downward and running perpendicularly to the arm. A cutter axle 54 passes through the walls of the channel block near the lower edges, and supports a cutter wheel 56 within the channel. A pair of upper sprockets 60 are positioned opposite each other adjacent the exterior walls of the channel block. The cutter and sprockets rotate relative to the channel block, and may rotate with respect to each other. In alternative embodiments, the cutter and sprockets may be fixed to the shaft, which may rotate with respect to the channel as a unit.

The cutter blade is a steel wheel having a tapered medial flange 62 that has a sharp peripheral edge 64. In an alternative embodiment, the flange may be mostly flat, with a sharpened taper or bevel only at the edge. The flange has a radial length selected to permit cutting of material having a thickness of up to the length, including the typical thicknesses of the wide range of tire sizes. The sprockets are shown as roller chain drive sprockets, although any wheel having an articulated periphery may be used. Alternatives includes deeply knurled surfaces, abrasive coated surfaces, protruding bumps, pins, or any other surface irregularity that will tend to bite, engage, or otherwise generate resistance to slippage when pressed into a resilient material such as rubber from vehicle tires. The cutter sprockets have a radius greater than that of the cutter wheel, and define gaps between the sprocket teeth that have a depth to provide a minimum radius approximately equal to the cutter radius.

The anvil assembly 31 includes an anvil wheel 66 mounted to the drive shaft 22, and a pair of drive sprockets 70 mounted to opposite faces of the anvil wheel. The anvil wheel, sprockets, and shaft rotate together as a unit upon rotation of the motor 25. The anvil wheel is a hard steel unit having a medial peripheral edge providing an anvil surface 72 having a smooth cylindrical shape unbroken by any grooves or channels. The edges of the periphery are abruptly chamfered away from the anvil surface. The drive sprockets have extending teeth like the cutter sprockets, and similar alternatives are possible as noted above. Preferably, the sprocket teeth extend to the same radius as the anvil wheel, with the gaps between the teeth being at a lesser radius that is still greater than the radius of the wheel faces as defined by the chamfered edges.

In the closed position shown, the cutter edge 64 just abuts or nearly abuts the anvil surface 72 at its midline. The structure of the cutter arm, base, pivot bearing, and lockdowns ensures that the cutter does not deflect more than a minimal amount away from the anvil under an upward load. In the preferred embodiment, the adjustment screws 46 are set so that the cutter edge just lightly touches the anvil surface when the cutter arm is locked down. In the absence of appreciable force between the cutter and the anvil, a sharp edge is preserved, with limited wear arising only from the interaction with tires as discussed below. Together, the cutter and anvil define a "nip" 74 of contact or near contact, in the manner of tangentially contacting rollers.

The cutter sprockets are positioned outboard of the anvil sprockets, with a gap between each cuter and its associated anvil sprocket to allow passage of a tire portion in the gap between without shearing. The peripheries of the sprockets overlap, with the teeth of the cutter sprockets extending radially beyond the teeth of the anvil sprockets. When the sidewall of a tire 76 is positioned between the cutter and anvil, and the apparatus closed and locked down, the tire will be cut, compressed, and stretched as shown in FIG. 3a. The cutter has penetrated the tire wall, causing a split.

The cutter sprockets 60 are stretching the portion of the tire positioned over the anvil wheel and sprockets, causing the tire portion between the sprockets to be stretched, and to be bowed concavely upward toward the cutter wheel. This facilitates cutting, as the stretched rubber is more prone to cut than simply to compress under the cutter wheel, particularly at the bowed and stretched upper surface. This bending and stretching pulls the tire material slightly away from the cutter wheel, reducing friction forces during cutting. In addition, any web of uncut rubber at the lower surface of the tire that remains uncut tends to be torn by the stretching forces as the cutting proceeds. Because the teeth penetrate deep into tire wall, and have sharp edges, the tire resists slipping while being driven, in spite of the moderate forces needed to drive the tire through the resistance of the cutter wheel.

Unlike shearing cutters, which rely on substantial tearing of the rubber material, the cutting action of the rotary cutter requires less energy. And unlike blade cutters that operate as a knife, the rotary cutter does not need to slide through the resistant rubber material, but cuts in compression. This compressive cutting operates by the forcing of the rolling cutter through the thickness of the advancing tire material. This significant force is provided by the rigidity of the apparatus, and need not be directly applied in the direction of motion by the force providing the motion. By pulling the tire through a wheel having a radius significantly greater than the tire thickness, significant leverage is obtained.

To cut the sidewalls of a tire, the apparatus is opened, and a tire is placed so that the anvil is within the tire near the interior surface of the treadwall. The remainder of the tire droops below the anvil support arm 24, and may rest on the floor or on the supports 30. The cutter arm is lowered to the closed position, with the leverage of the hold-downs providing the force to press the cutter into the side wall as shown in FIG. 3a. The motor is then started, and the rotation of the anvil and anvil sprockets draws the tire through the nip. As rotation progresses, the portion of the tire approaching the nip is stretched by the overlapping sprockets, and remains stretched until it passes through the nip.

The guide pins maintain the tire in the position illustrated in FIG. 2 throughout cutting, so that the cutting line remains generally concentric and does not wander as the upper tire bead rides against the guide pins. For particularly thick or tough tires, more than one rotation of cutting may be needed. Generally, the cutter will find the groove cut on the first rotation due to the aligning effect of the guide pins. If not, an operator may apply force to the rotating tire to steer the cut to a proper position beneath the cutter, after which the cutter will naturally follow the reexisting groove.

While the disclosure is made in terms of a preferred embodiment, the invention is not intended to be so limited. For instance, the apparatus may perform bagel cuts about the midline of the tread by positioning a tire hanging vertically from the anvil, with the anvil centered on the tread midline. In addition, for embodiments used for cutting much larger tires such as those used on earthmover and construction equipment, the sprocket wheel spacing may be made adjustable. To accommodate the 2–3 inch-think sidewalls of these tires, the cutter sprockets may be connected to a separate axle that can be adjusted up and down with respect to the cutter axis. As such tires are cut over several passes, the cutter sprocket are increments downward for each pass.

What is claimed is:

1. A tire cutter apparatus comprising:
    a frame;
    a rotatable anvil wheel assembly pivotally connected to the frame by a cutter arm and a pivot bearing;
    a cutter wheel assembly connected to the frame;
    the anvil wheel assembly including an anvil wheel having a smooth circumferential anvil surface;
    the cutter wheel assembly including a cutter wheel having a peripheral edge;
    at least one of the cutter wheel assembly and the anvil wheel assembly being movable with respect to the other between a closed position in which the cutter wheel peripheral edge is adjacent the anvil surface to define a cutting site, and an open position in which the cutter wheel edge and the anvil surface are spaced apart;
    the anvil surface remaining radially beyond the peripheral edge of the cutter wheel when in the closed position, such that the cutter and anvil do not overlap; and the cutter wheel assembly attached between a first pair of spaced-apart gripping wheels, and the anvil wheel assembly attached between a second pair of spaced apart gipping wheels, at least one of the first and second pairs of gripping wheels having articulated peripheral edges, such that the gripping wheel engage a portion of a tire to move the tire through the cutting site.

2. The apparatus of claim 1 wherein the gripping wheels are connected to a drive motor to provide a motive force.

3. The apparatus of claim 1 wherein the second pair of gripping wheels are rotatably engaged to the anvil wheel.

4. The apparatus of claim 1 wherein the anvil assembly includes at least one articulated gripping wheel and the cutter assembly includes at least one articulated gripping wheel.

5. The apparatus of claim 4, wherein the first and second pair of gripping wheels overlap to compressibly capture a tire portion therebetween.

6. The apparatus of claim 4 wherein the first and second pair of gripping wheels overlap and are positioned laterally on each side of the cutting site.

7. The apparatus of claim 1 wherein the cutting site is a nip at which the cutting wheel edge abuts the anvil surface.

8. The apparatus of claim 1 wherein the gripping wheels are connected to a motor.

9. A tire cutter apparatus comprising:

a frame;

a rotatable anvil wheel assembly connected to the frame;

a cutter wheel assembly connected to the frame;

the anvil wheel assembly including an anvil wheel having a smooth circumferential anvil surface;

the cutter wheel assembly including a cutter wheel having a peripheral edge;

at least one of the cutter wheel assembly and the anvil wheel assembly being movable with respect to the other between a closed position in which the cutter wheel edge abuts the anvil surface to define a nip, and an open position in which the cutter wheel edge and the anvil surface are spaced apart; and the cutter wheel assembly attached between a first pair of spaced-apart gripping wheels, and the anvil wheel assembly attached between a second pair of spaced apart gripping wheels, at least one of the first and second pairs of gripping wheels having articulated peripheral edges.

10. The apparatus of claim 9 wherein the anvil surface is a cylindrical surface.

11. The apparatus of claim 9 wherein the cutter edge defines a cutter plane perpendicular to the anvil surface at the nip.

12. The apparatus of claim 9 wherein at least one of the articulated gripping wheels is connected to a drive motor and is operable to move a tire portion through the nip by directly engaging the tire portion.

13. The apparatus of claim 12 wherein at least one of the articulated gripping wheels is connected to a respective one of the cutter wheel assembly and the anvil wheel assembly.

14. The apparatus of claim 9 wherein the cutter and anvil comprise a compression cutter.

15. The apparatus of claim 9 wherein the cutter and anvil comprise a compression cutter.

16. A tire cutter apparatus comprising:

a frame;

a rotatable anvil wheel assembly connected to the frame for rotation on a first axis;

a cutter wheel assembly connected to the frame for rotation on a second axis;

the anvil wheel assembly including an anvil wheel having a smooth circumferential anvil surface having a first radius;

the cutter wheel assembly including a cutter wheel having a peripheral edge and a second radius;

at least one of the cutter wheel assembly and the anvil wheel assembly being movable with respect to the other between a closed position in which the cutter wheel edge is adjacent the anvil surface to define a cutting site, and an open position in which the cutter wheel edge and the anvil surface are spaced apart;

wherein the sum of the first and second radii is less than or equal to the distance between the first and second axes when in the closed position, such that the anvil and cutter wheels do not overlap when in the closed position; and the cutter wheel assembly attached between a first pair of spaced-apart gripping wheels, and the anvil wheel assembly attached between a second pair of spaced apart gripping wheels at least one of the first and second pairs of gripping wheels having articulated peripheral edges.

17. The apparatus of claim 16 whereein the anvil surface is a cylindrical surface.

18. The apparatus of claim 16 wherein the cutter edge defines a cutter plane perpendicular to the anvil surface at the nip.

19. The apparatus of claim 16 wherein at least one of the articulated gripping wheels is connected to a drive motor and operable to move a tire portion through the nip.

* * * * *